(12) United States Patent
Koh

(10) Patent No.: US 7,973,848 B2
(45) Date of Patent: Jul. 5, 2011

(54) METHOD AND APPARATUS FOR PROVIDING COMPOSITION INFORMATION IN DIGITAL IMAGE PROCESSING DEVICE

(75) Inventor: Sung-shik Koh, Changwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 521 days.

(21) Appl. No.: 12/080,048

(22) Filed: Mar. 31, 2008

(65) Prior Publication Data

US 2008/0239104 A1     Oct. 2, 2008

(30) Foreign Application Priority Data

Apr. 2, 2007   (KR) .................. 10-2007-0032507
Jun. 26, 2007  (KR) .................. 10-2007-0063125

(51) Int. Cl.
*H04N 5/222* (2006.01)

(52) U.S. Cl. ................................... 348/333.02
(58) Field of Classification Search ............. 348/333.02, 348/333.03, 333.04
See application file for complete search history.

(56) References Cited

U.S. PATENT DOCUMENTS

| 6,606,117 | B1 * | 8/2003 | Windle | 348/239 |
| 7,317,485 | B1 * | 1/2008 | Miyake et al. | 348/333.02 |
| 7,349,020 | B2 * | 3/2008 | Stavely et al. | 348/333.02 |
| 7,432,973 | B2 * | 10/2008 | Iga | 348/333.03 |
| 7,738,024 | B2 * | 6/2010 | Ogasawara et al. | 348/333.03 |
| 2002/0146247 | A1 * | 10/2002 | Nonaka | 396/96 |
| 2004/0174438 | A1 * | 9/2004 | Jung | 348/222.1 |
| 2007/0274596 | A1 * | 11/2007 | Murata et al. | 382/209 |

FOREIGN PATENT DOCUMENTS

| CN | 1933553 A | 3/2007 |
| EP | 1 855 464 A2 | 11/2007 |
| JP | 11-102280 A | 4/1999 |
| JP | 2004-020869 A | 1/2004 |
| JP | 2004-105665 A | 4/2004 |
| KR | 20030073879 A | 9/2003 |
| WO | WO 01/42738 A1 | 6/2001 |

* cited by examiner

*Primary Examiner* — James M Hannett
(74) *Attorney, Agent, or Firm* — Drinker Biddle & Reath LLP

(57) ABSTRACT

Provided is a method and apparatus for providing composition information in a digital image processing device whereby composition information of a target object displayed in a live-view screen is provided using auditory information or visual information during photographing in order to induce a composition of the target object to be matched to a predetermined composition for photographing. The apparatus includes a detection unit detecting a composition of an object from a live-view image to be captured, a comparison unit comparing the detected composition with a reference composition, and a control unit performing a control operation to output an auditory alert signal until the detected composition is matched to the reference composition and performing a control operation to output an auditory match signal when the detected composition is matched to the reference composition.

24 Claims, 9 Drawing Sheets

FIG. 1 (PRIOR ART)
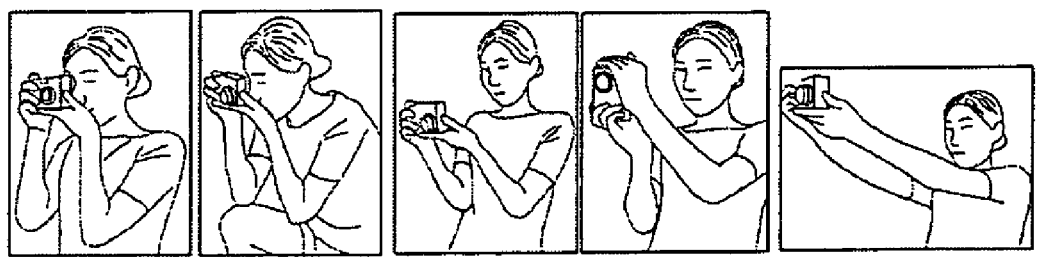
(a)
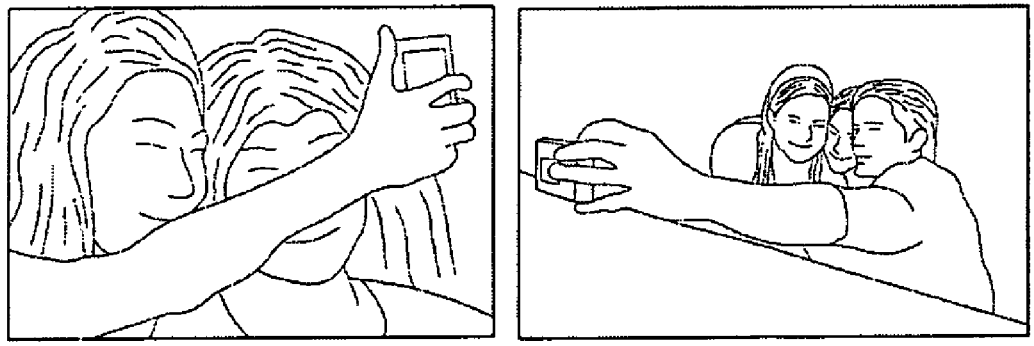
(b)

FIG. 6
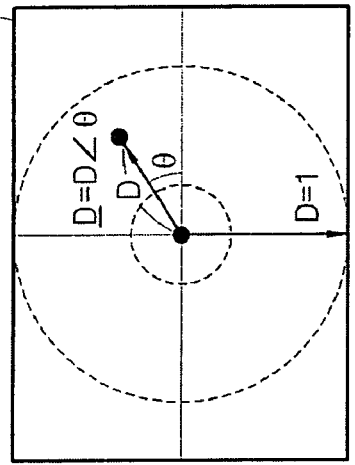
(a)
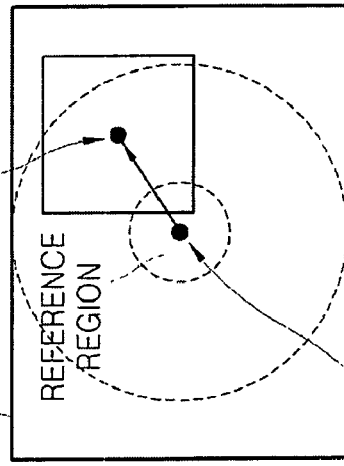
(b)
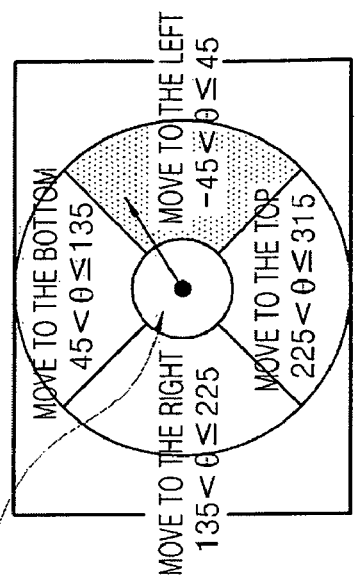
(c)
(d)
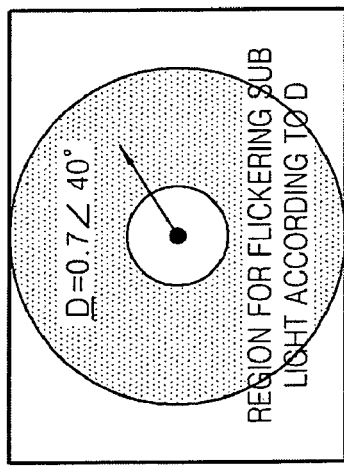
(e)
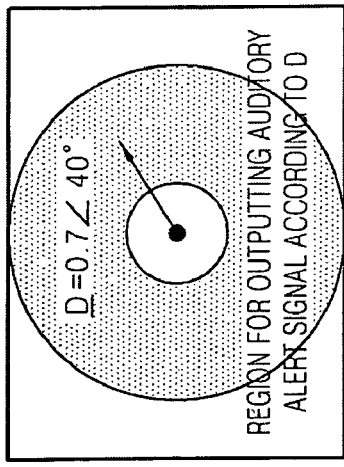
(f)

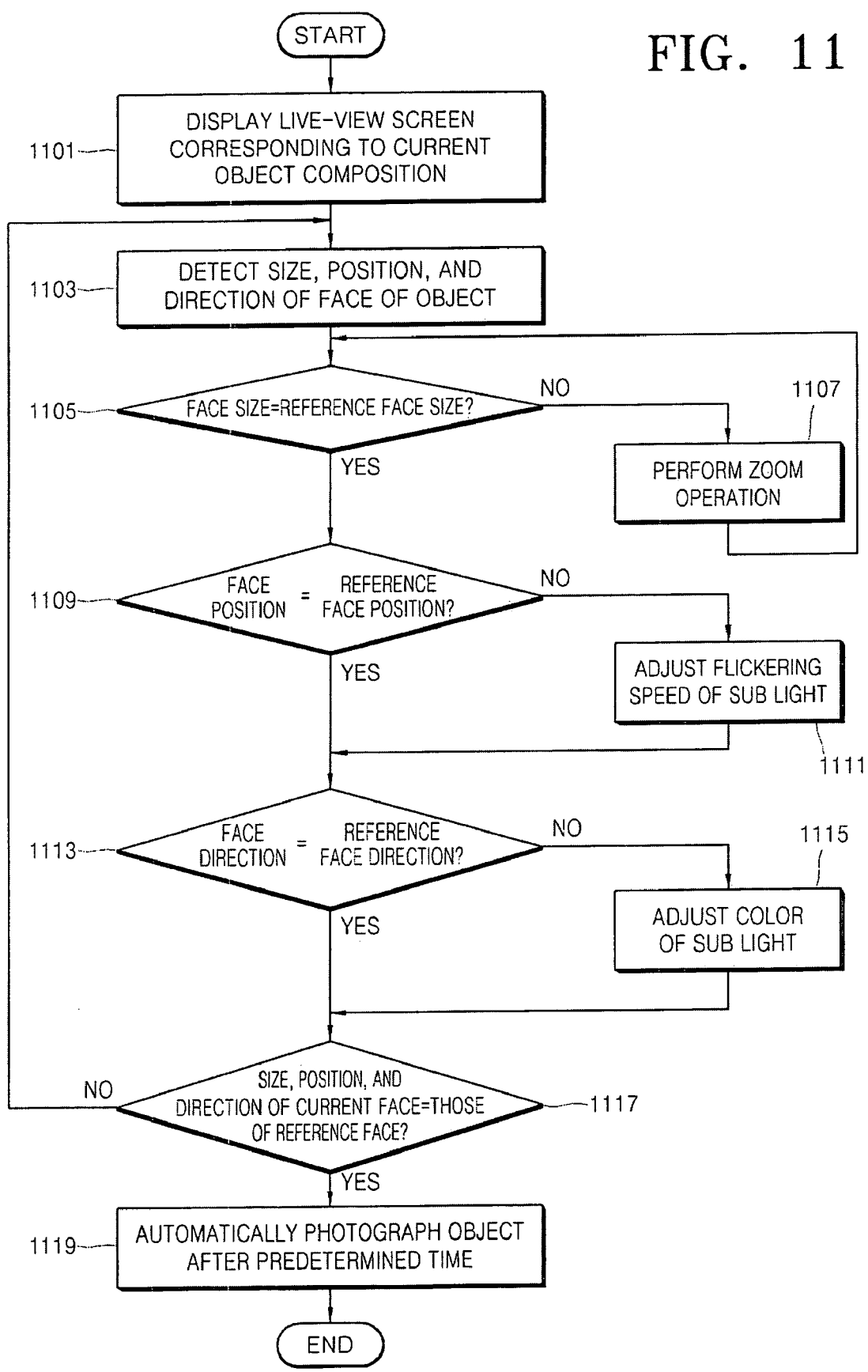

METHOD AND APPARATUS FOR PROVIDING COMPOSITION INFORMATION IN DIGITAL IMAGE PROCESSING DEVICE

CROSS-REFERENCE TO RELATED PATENT APPLICATION

This application claims the benefits of Korean Patent Application No. 10-2007-0063125, filed on Jun. 26, 2007, and Korean Patent Application No. 10-2007-0032507, filed on Apr. 2, 2007, in the Korean Intellectual Property Office, the disclosures of which are incorporated herein in its entirety by reference.

BACKGROUND OF THE INVENTION

1. Field of the Invention

The present invention relates to a photographing apparatus and method, and more particularly, to a method and apparatus for providing composition information in a digital image processing device whereby composition information of a target object compared to a reference composition is provided using auditory information.

2. Description of the Related Art

With recent advances in image processing technologies, photographing devices such as digital cameras and camcorders that are easy to carry and cellular phone cameras, are gaining in popularity. These photographing devices can take not only still pictures but also moving pictures of a moving object, and are used especially to take portraits.

FIG. 1A illustrates an example of general photographing according to the prior art. As can be seen from FIG. 1A, a photographing process depends only on a user's visual information. FIG. 1B illustrates an example of self-photographing according to the prior art when a liquid crystal display (LCD) is arranged on the back side of a photographing device. In this case, reliability in obtaining a desired picture for a user degrades because the user cannot see the LCD during self-photographing.

FIGS. 2A through 2E illustrate an example of self-photographing using a tripod according to the prior art. In this case, a user first sets up the tripod as illustrated in FIG. 2A and then performs self-photographing with a predetermined composition as illustrated in FIG. 2B. However, self-photographing may fail as illustrated in FIGS. 2C and 2D because the user cannot know her position and composition immediately prior to self-photographing. In this case, the user experiences the inconvenience of having to repeat photographing until a picture is taken with a desired position and composition.

SUMMARY OF THE INVENTION

The present invention provides a method and apparatus for providing composition information in a digital image processing device whereby composition information of a target object displayed in a live-view screen is provided using auditory information or visual information during photographing in order to introduce the composition of the target object compared to a predetermined composition for photographing.

According to an aspect of the present invention, there is provided an apparatus for providing composition information in a digital image processing device. The apparatus includes a detection unit detecting the composition of an object from a live-view image to be captured, a comparison unit comparing the detected composition with a reference composition, and a control unit performing a control operation to output an auditory alert signal until the detected composition is matched to the reference composition and performing a control operation to output an auditory match signal when the detected composition is matched to the reference composition.

The composition of the object may include the size, position, and direction of the object and the reference composition may include the size, position, and direction of a reference object.

The reference composition may be set by a user.

The control unit may perform a control operation to output different auditory alert signals until the composition of the object is matched to the reference composition.

The control unit may perform a control operation to automatically photograph the object after a lapse of a predetermined time from a point in time when the auditory match signal is output.

The auditory alert signal and the auditory match signal may also be voice message signals.

According to another aspect of the present invention, there is provided an apparatus for providing composition information in a digital image processing device. The apparatus includes a detection unit detecting the composition of an object from a live-view image, a comparison unit comparing the detected composition with a reference composition, and a control unit performing a control operation to output a visual alert signal until the detected composition is matched to the reference composition and performing a control operation to automatically capture the live-view image after a lapse of a predetermined time if the composition of the object is matched to the reference composition.

The composition of the object may be set by a user, and if the composition of the object is not set by the user, the composition of the object may be set to a central portion of a screen.

The composition of the object may include the size, position, and direction of the object and the reference composition may include a size, position, and direction of a reference object.

The visual alert signal may be output from a light that provides light to the object.

The control unit may control a zoom operation by comparing the size of the object with the size of the reference object, adjust the flickering speed of the light by comparing the position of the object with the position of the reference object, and adjust the color emitted by the light by comparing the direction of the object with the direction of the reference object.

According to another aspect of the present invention, there is provided a method of providing composition information in a digital image processing device. The method includes (a) detecting the composition of an object from a live-view image to be captured, (b) comparing the detected composition with a reference composition, and (c) performing a control operation to output an auditory alert signal until the detected composition is matched to the reference composition and performing a control operation to output an auditory match signal when the detected composition is matched to the reference composition.

The method may include (d) performing a control operation to automatically photograph the object after a lapse of a predetermined time from a point in time when the auditory match signal is output.

Step (c) may include performing a control operation to output different auditory alert signals until the composition of the object is matched to the reference composition.

In (c), the auditory alert signal and the auditory match signal may be voice message signals.

According to another aspect of the present invention, there is provided a method of providing composition information in a digital image processing device. The method includes (a) detecting the composition of an object, including size, position, and direction of the object, from a live-view image, (b) comparing the detected composition with a reference composition including size, distance, and direction of a reference object, (c) outputting a visual alert signal until the detected composition is matched to the reference composition, and (d) automatically capturing the live-view image after a lapse of a predetermined time if the composition of the object is matched to the reference composition.

The composition of the object may be set by a user, and if the composition of the object is not set by the user, the composition of the object may be set to a central portion of a screen.

In (c), the visual alert signal may be output from a light that provides light to the object.

Step (c) may include controlling a zoom operation by comparing the size of the object with the size of the reference object, adjusting a flickering speed of the light by comparing the position of the object with the position of the reference object, and adjusting the color emitted by the light by comparing the direction of the object with the direction of the reference object.

BRIEF DESCRIPTION OF THE DRAWINGS

The above and other features and advantages of the present invention will become more apparent by describing in detail embodiments thereof with reference to the attached drawings in which:

FIGS. 1A and 1B illustrate an example of general photographing and an example of self-photographing using a digital image processing device according to the prior art;

FIGS. 6a through 6F are diagrams for describing composition detection according to face recognition in the image processing device of FIG. 5;

FIGS. 8a through 9c illustrate examples of auditory alert signals and visual alert signals that are generated in the apparatus illustrated in FIG. 5 according to a composition of an object;

FIG. 11 is a flowchart illustrating a method of providing composition information in a digital image processing device according to a second embodiment of the present invention.

DETAILED DESCRIPTION OF THE INVENTION

Figure 2:
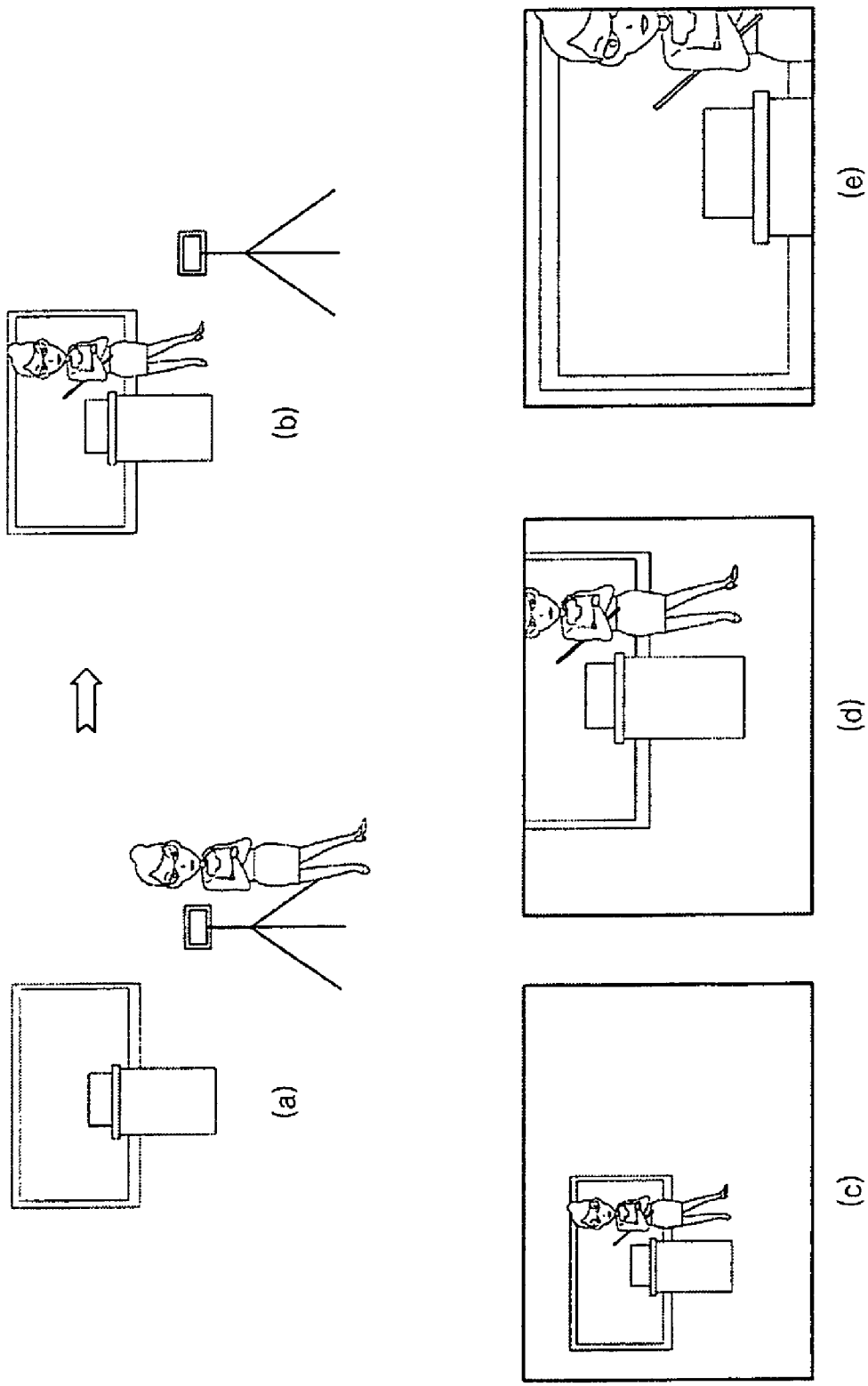
FIGS. 2A through 2E illustrate an example of self-photographing using a digital image processing device according to the prior art.

Hereinafter, embodiments of the present invention will be described in detail with reference to the accompanying drawings. It should be noted that like reference numerals refer to like elements illustrated in one or more of the drawings. In the following description of the present invention, detailed descriptions of known functions and configurations incorporated herein will be omitted for conciseness and clarity.

Figure 3:
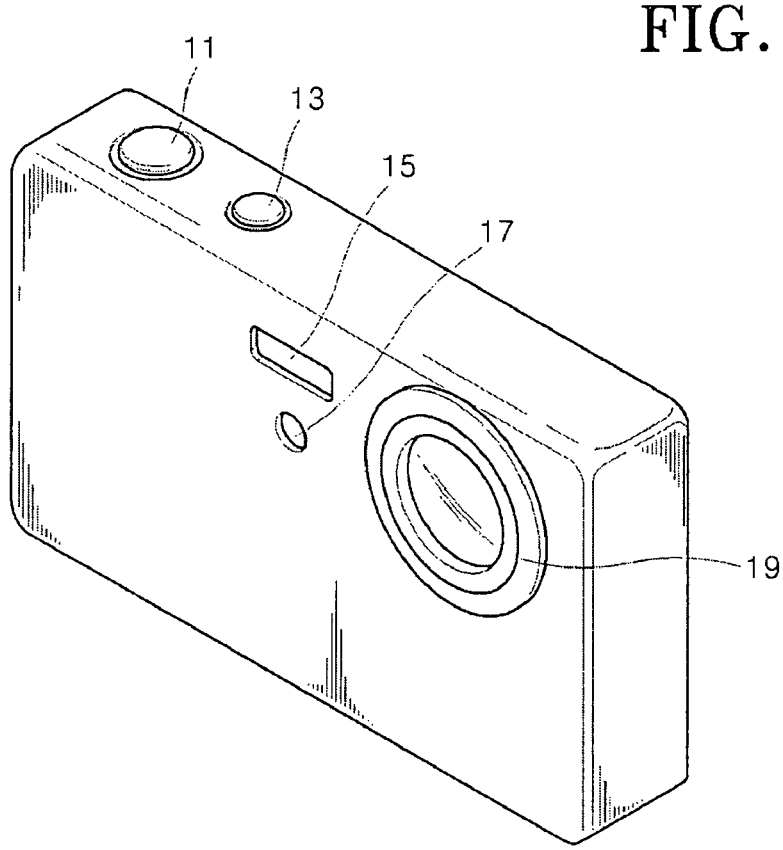
FIG. 3 is a perspective view of a digital image processing device.

FIG. 3 is a perspective view of a digital image processing device.

The shutter-release button 11 is used to open and close an iris in order to expose a charge coupled device (CCD) or a film to light for a predetermined amount of time and records an image in the CCD by appropriately exposing an object in cooperation with an iris (not shown).

The shutter-release button 11 generates a first photographing signal and a second photographing signal according to a user input. Upon a first, partial manipulation of the shutter-release button 11 as a half-shutter signal, the digital image processing device adjusts the focus and the amount of light. When the digital image processing device is in focus, a green light is turned on in a display unit. After the digital image processing device finishes focusing and adjusting the amount of light in response to the first manipulation of the shutter-release button 11, the shutter-release button 11 is further manipulated so as to input a full-shutter signal for photographing.

The power button 13 is manipulated in order to operate the digital image processing device by supplying power to the digital image processing device.

The flash 15 momentarily gives bright light to an object for photographing in a dark environment. The flash 15 has flash modes such as auto flash, fill flash, flash off, red-eye reduction, slow sync, and the like.

The sub light 17 gives light to an object in order to allow the digital image processing device to quickly and accurately adjust a focus in an automatic manner in insufficient light or night photographing conditions.

The lens unit 19 receives light from an external light source and processes an image.

Figure 4:
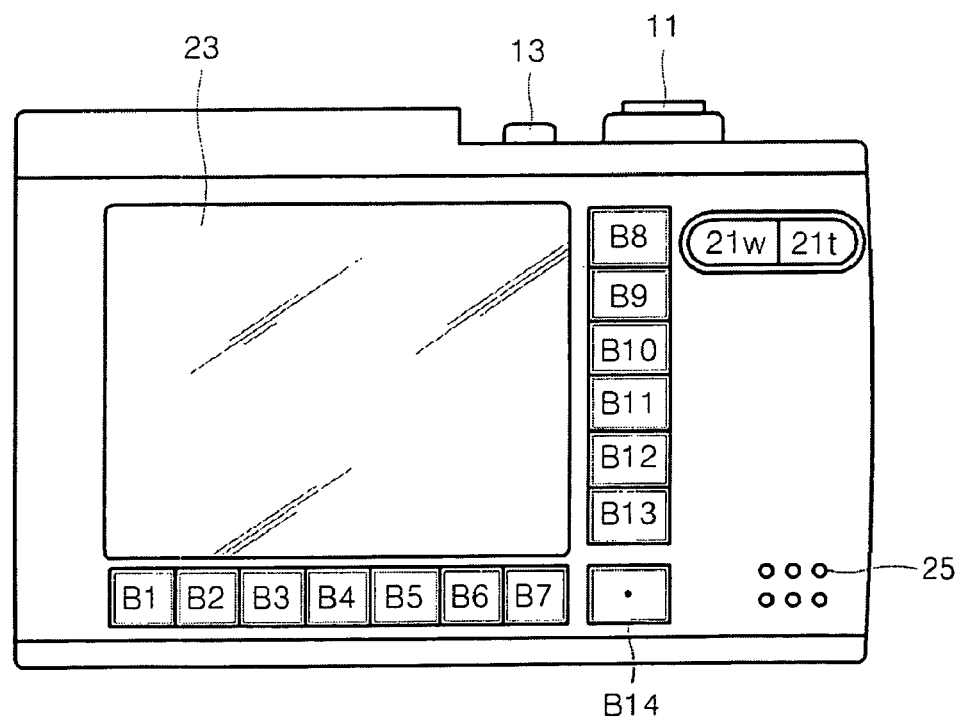
FIG. 4 is a back view of the digital image processing device illustrated in FIG. 3.

FIG. 4 is a back view of the digital image processing device illustrated in FIG. 1. Referring to FIG. 2, the digital image processing device includes a wide-angle zoom button 21w, a telephoto zoom button 21t, a display unit 23, a speaker 25 and input buttons B1 through B14 having touch sensors or contact switches.

When the wide-angle zoom button 21w or the telephoto zoom button 21t is manipulated, the angle of view becomes wider or narrower. In particular, the wide-angle zoom button 21w or the telephoto zoom button 21t is manipulated in order to change the size of a selected exposure region. The size of the selected exposure region is reduced upon manipulation of the wide-angle zoom button 21w, and the size of the selected exposure region increases upon input of the telephoto zoom button 21t.

The speaker 25 outputs an auditory signal such as a voice signal stored in the digital image processing device, e.g., a voice signal of a stored moving picture or a stored music file signal. In the present invention, the speaker 25 outputs an auditory alert signal until the composition of a target object to be photographed is matched to a reference composition and outputs an auditory match signal when the composition of the target object is matched to the reference composition.

The input buttons B1 through B14 are provided in a horizontal line and a vertical line of the display unit 23. The input buttons B1 through B14 may have touch sensors (not shown) or contact switches (not shown).

In other words, when the input buttons B1 through B14 have touch sensors, the user can select an desired value, e.g., color or brightness, from a main menu item or can activate a sub menu icon included in a main menu icon, by moving up/down/left/right while touching the buttons B1 through B7 in the horizontal line or the buttons B8 through B14 in the vertical line.

When the input buttons B1 through B14 have contact switches, the user can execute a desired function by directly selecting a main menu icon and a sub menu icon thereof. A touch sensor input requires a relatively weak touch compared to a contact switch input, and the contact switch input requires a relatively strong touch compared to the touch sensor input.

Figure 5:
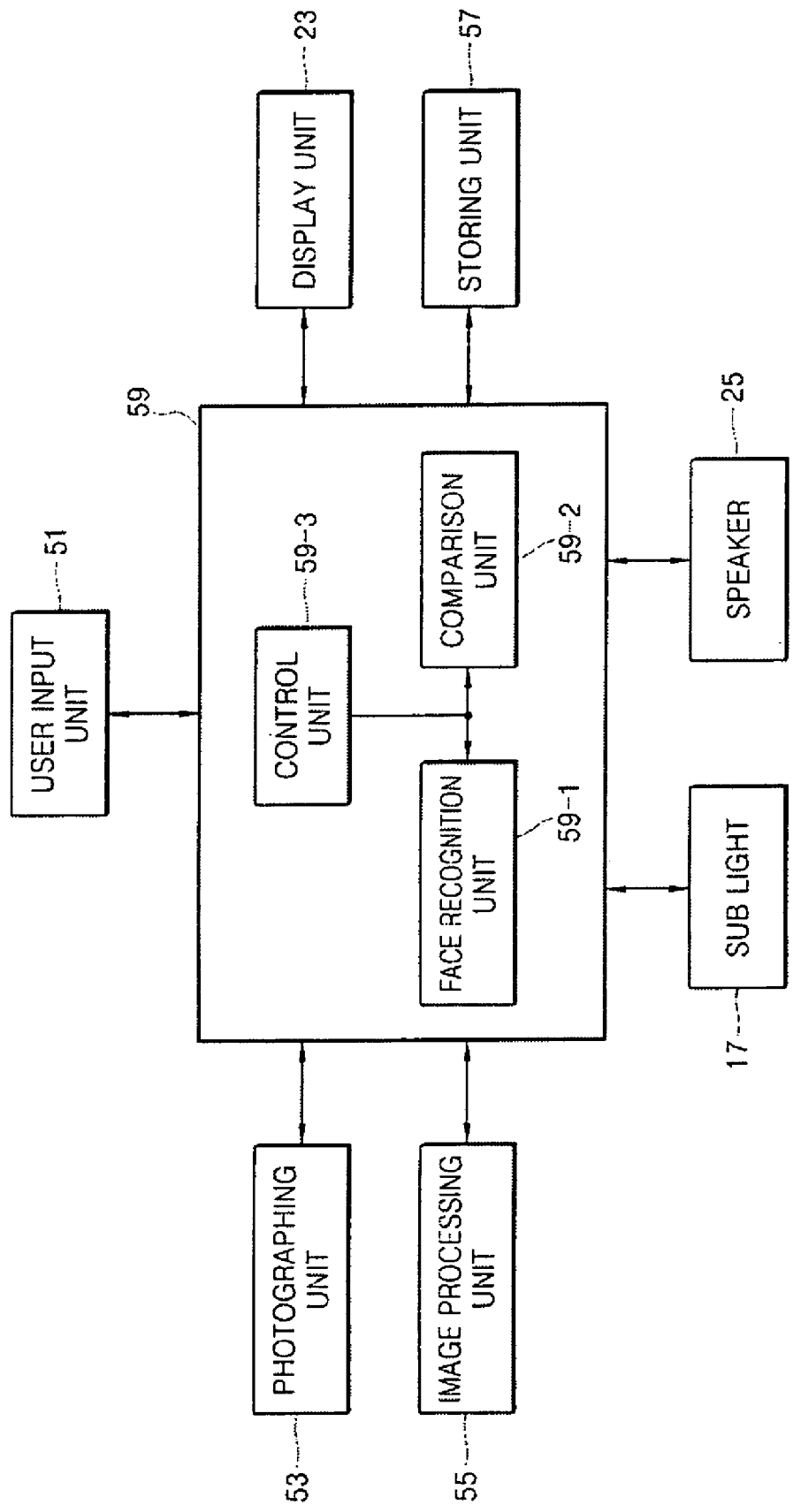
FIG. 5 is a block diagram of an apparatus for providing composition information in a digital image processing device according to an embodiment of the present invention.

FIG. 5 is a block diagram of an apparatus for providing composition information in a digital image processing device according to an embodiment of the present invention. Referring to FIG. 5, the apparatus includes the sub light 17, the display unit 23, a user input unit 51, a photographing unit 53, an image processing unit 55, a storing unit 57, and a digital signal processing unit 59. The digital signal processing unit 59 includes a face recognition unit 59-1, a comparison unit 59-2, and a control unit 59-3.

The sub light 17, which gives light to an object, provides distance information and direction guidance information to a user during self-photographing. A flickering speed of the sub light 17 changes according to a distance of the object and a reference distance and the color representation of the sub light 17 changes according to a direction of the object and a reference direction, i.e., a right direction and a left direction.

Referring to FIGS. 3 and 4, the user input unit 51 includes the shutter-release button 11 that is used to open or close an iris in order to expose a CCD or a film to light for a predetermined amount of time, the power button 13 that is used to supply power, the wide-angle zoom button 21w and the telephoto zoom button 21t for increasing or reducing the angle of view, and the buttons B1 through B14 for executing various menus associated with functions of the digital image processing device.

The photographing unit 53 includes the shutter-release button 11, and a lens unit, an iris, a CCD, and an analog-to-digital converter (ADC) that are not shown in the figures.

The shutter-release button 11 is used to adjust the amount of light for light exposure in cooperation with the iris. The lens unit receives light from an external light source and processes an image. The iris adjusts the amount of incident light according to the amount of its opening/closing. The amount of opening/closing of the iris is controlled by the digital signal processing unit 59.

The CCD receives the light input through the lens unit and outputs an image captured through the lens unit in synchronization with a vertical sync signal according to the accumulated amount of light. The digital image processing device can capture an image by means of the CCD that converts light reflected from an object into an electric signal.

The image processing unit 55 performs signal processing to allow an image signal converted into an electric signal to be displayed. To this end, the image processing unit 55 removes a black level caused by dark current and performs gamma correction for encoding the input image signal so as to be appropriate for the nonlinearity of human vision. The image processing unit 35 performs color filter array (CFA) interpolation by interpolating a Bayer pattern implemented by RGRG lines and GBGB lines of gamma-corrected predetermined data into RGB lines, converts the interpolated RGB signal into a YUV signal, performs edge compensation by filtering Y signals by using a high-pass filter and color correction by correcting color values of U and V signals by using a standard color coordinate system, and removes noise from the U and V signals. The image processing unit 35 then compresses and signal-processes the YUV signals from which noise has been removed, and generates a JPEG file. The generated JPEG file is displayed in the display unit 23 and is stored in the storing unit 57. The image processing unit 55 operates under the control of the digital signal processing unit 59.

The present invention includes two embodiments to provide composition information in a digital image processing device.

First, in order to allow manipulation of the digital image processing device using only auditory information beyond the limit of conventional manipulation of the digital image processing device which depends on only visual information, the digital signal processing unit 59 includes the face recognition unit 59-1, the comparison unit 59-2, and the control unit 59-3.

The face recognition unit 59-1 serves as a detector for detecting the composition of an object from a displayed live-view image. More specifically, the face recognition unit 59-1 detects face information, i.e., the size, position, and direction of a face within the display unit 23, as the composition of the object from the live-view image displayed in the display unit 23.

The composition detection of the face recognition unit 59-1 will now be described with reference to FIGS. 6a through 6f. FIGS. 6a through 6f are diagrams for describing composition detection according to face recognition in the image processing device of FIG. 5.

FIG. 6a illustrates face size detection of the face recognition unit 59-1. Referring to FIG. 6a, a live-view image is displayed on the display unit 23. The face recognition unit 59-1 detects a face recognition region based on color or edge characteristics, and may calculate the size of the face recognition region.

FIG. 6b illustrates face position detection of the face recognition unit 59-1. The face recognition unit 59-1 calculates the position of a face using the distance between the center of the face recognition region and the center of the display unit 23. In other words, a face distance D=|Center of display unit−Center of face|.

FIG. 6c illustrates face direction detection of the face recognition unit 59-1. The face direction is the angular position of the center of the face recognition region, i.e. the center of the face, with respect to the center of the display unit 23, and the face direction value can be expressed in θ. In other words, the face direction represents the angular location of the face with respect to the center, a value that can be useful in generating auditory signals to instruct the user to move toward the center. As illustrated in FIG. 6f, when the face direction value θ is between −45° and 45°, the face tends to be to the right of center, when the face direction value θ is between 45° and 135°, the face tends to be to the top of center, when the face direction value θ is between 135° and 225°, the face tends to be to the left of center, and when the face direction value θ is between −225° and 315°, the face tends to be to the bottom of center.

The storing unit 57 stores a reference composition that includes reference face information, i.e., the size, position, and direction of a reference face. Specifically, the position and the direction of the reference face are values within a reference region that is a predetermined region off from the center of the display unit 23 as illustrated in FIG. 6b, and if the position and direction of a face from a live-view image are within the reference region, they are determined to be a desirable photographing composition. The reference composition stored in the storing unit 57 is used to induce a composition of a face image displayed in the display unit 23 to be matched to a desirable photographing composition during photographing. The reference composition may be set as default or may be set to an appropriate value according to a user's taste.

The comparison unit 59-2 compares the composition of a current face from a live-view image (or a current composition) detected by the face recognition unit 59-1 with the reference composition stored in the storing unit 57 and outputs a comparison result to the control unit 59-3.

If the current composition is not matched to the reference composition, the control unit 59-3 controls the speaker 25 to output an auditory alert signal. If the current composition is matched to the reference composition, the control unit 59-3 controls the speaker 25 to output an auditory match signal.

The control unit 59-3 outputs the auditory alert signal if the size of the current face is not matched to the size of the reference face stored in the storing unit 57, if the position of the current face is not matched to the position of the reference face stored in the storing unit 57, and if the direction of the current face is not matched to the direction of the reference face stored in the storing unit 57. A combination of the auditory alert signal corresponding to a face size, the auditory alert signal corresponding to a face position, and the auditory alert signal corresponding to a face direction finally controls the speaker 25. FIG. 6*d* shows that an auditory alert signal is output because the position and direction of the current face of FIG. 6*a* is outside the reference region.

After the speaker 25 outputs the auditory match signal, the control unit 59-3 may perform a control operation so that an image can be captured by automatic shutter-input after a lapse of a predetermined time, e.g., 2 seconds. When the current composition and the reference composition are matched to each other, an undesirable image may be captured due to vibration during a user's manipulation of the shutter-release button 11 for photographing. Thus, the control unit 59-3 may perform a control operation so that an image having the current composition can be automatically captured after a lapse of a predetermined time from a point in time when the speaker 25 outputs the auditory match signal.

FIGS. 7*a* through 7*i* illustrate examples in which the control unit 59-3 controls the speaker 25 to output auditory alert signals and an auditory match signal according to the composition of an object.

Figure 7:
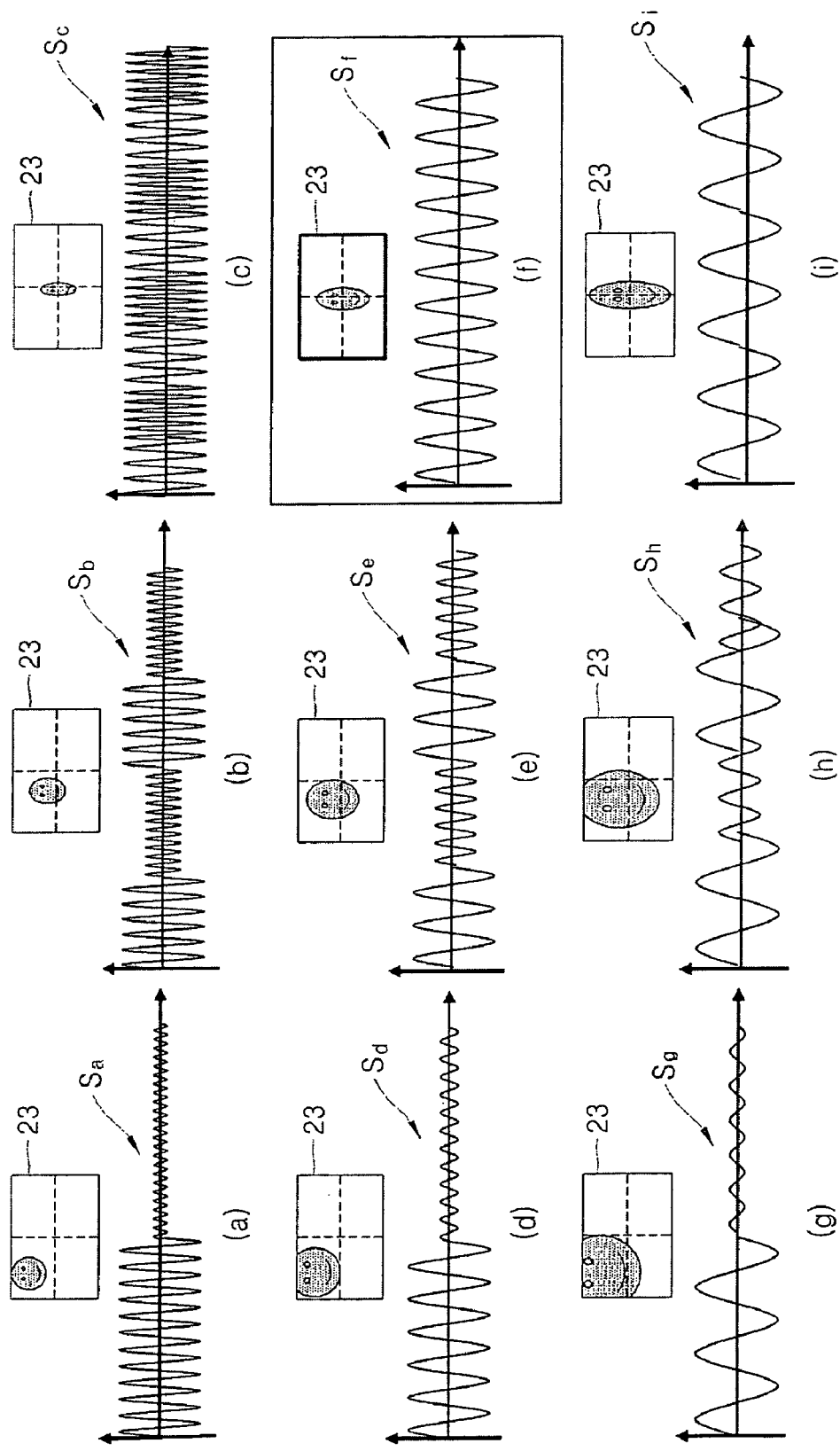
FIGS. 7a through 7i illustrate examples of auditory alert signals and an auditory match signal that are generated in the apparatus illustrated in FIG. 5 according to a composition of an object.

FIG. 7*f* illustrates an optimal screen in which the composition of a current face displayed in a live-view screen of the display unit 23, i.e., the size, position, and direction of the face, is matched to a reference composition stored in the storing unit 57. In this case, the control unit 59-3 controls the speaker 25 to output an auditory match signal $S_f$.

FIG. 7*a* illustrates an example in which the composition of the face displayed in the live-view screen of the display unit 23 tends to an upper-left portion of the live-view screen. When FIG. 7*a* is compared with FIG. 7*f*, no match occurs between face sizes, face positions, and face directions and thus the control unit 59-3 controls the speaker 25 to output an auditory alert signal $S_a$.

FIG. 7*b* illustrates an example in which the composition of the face displayed in the live-view screen of the display unit 23 tends to a center-left portion of the live-view screen. When FIG. 7*b* is compared with FIG. 7*f*, no match occurs between face sizes, face positions, and face directions and thus the control unit 59-3 controls the speaker 25 to output an auditory alert signal $S_b$. As can be seen from FIGS. 7*a* and 7*b*, the auditory alert signals $S_a$ and $S_b$ are different from each other.

FIG. 7*c* illustrates an example in which the composition of the face displayed in the live-view screen of the display unit 23 is located in a central portion of the live-view screen. When FIG. 7*c* is compared with FIG. 7*f*, a match occurs between face positions but no match occurs between face sizes and face directions and thus the control unit 59-3 controls the speaker 25 to output an auditory alert signal $S_c$. As can be seen from FIGS. 7*a* through 7*c*, the auditory alert signal $S_c$ is different from the auditory alert signals $S_a$ and $S_b$.

FIG. 7*d* illustrates an example in which the composition of the face displayed in the live-view screen of the display unit 23 is similar to that illustrated in FIG. 7*a* except that the size of the displayed face is larger than that illustrated in FIG. 7*a*. When FIG. 7*d* is compared with FIG. 7*f*, no match occurs between face sizes, face positions, and face directions and thus the control unit 59-3 controls the speaker 25 to output an auditory alert signal $S_d$. As can be seen from FIGS. 7*a* through 7*d*, the auditory alert signal $S_d$ is different from the auditory alert signal $S_a$, the auditory alert signal $Sb$, and the auditory alert signal $S_c$.

FIG. 7*e* illustrates an example in which the composition of the face displayed in the live-view screen of the display unit 23 is similar to that illustrated in FIG. 7*b* except that the size of the displayed face is larger than that illustrated in FIG. 7*b*. When FIG. 7*e* is compared with FIG. 7*f*, no match occurs between face sizes, face positions, and face directions and thus the control unit 59-3 controls the speaker 25 to output an auditory alert signal $S_e$. As can be seen from FIGS. 7*a* through 7*e*, the auditory alert signal $S_e$ is different from the auditory alert signals $S_a$, $S_b$, $S_c$, and $S_d$.

FIG. 7*g* illustrates an example in which the composition of the face displayed in the live-view screen of the display unit 23 is similar to that illustrated in FIG. 7*d* except that the size of the displayed face is larger than that illustrated in FIG. 7*d*. When FIG. 7*g* is compared with FIG. 7*f*, no match occurs between face sizes, face positions, and face directions and thus the control unit 59-3 controls the speaker 25 to output an auditory alert signal $S_g$. As can be seen from FIGS. 7*a* through 7*g*, the auditory alert signal $S_e$ is different from the auditory alert signals $S_a$, $S_b$, $S_c$, $S_d$, and $S_e$.

FIG. 7*h* illustrates an example in which the composition of the face displayed in the live-view screen of the display unit 23 is similar to that illustrated in FIG. 7*e* except that the size of the displayed face is larger than that illustrated in FIG. 7*e*. When FIG. 7*h* is compared with FIG. 7*e*, no match occurs between face sizes, face positions, and face directions and thus the control unit 59-3 controls the speaker 25 to output an auditory alert signal $S_h$. As can be seen from FIGS. 7*a* through 7*h*, the auditory alert signal $S_h$ is different from the auditory alert signals $S_a$, $S_b$, $S_c$, $S_d$, $S_e$, and $S_g$.

FIG. 7*i* illustrates an example in which the composition of the face displayed in the live-view screen of the display unit 23 is located in a central portion of the live-view screen. When FIG. 7*i* is compared with FIG. 7*f*, a match occurs between face positions, but no match occurs between face sizes and face directions and thus the control unit 59-3 controls the speaker 25 to output an auditory alert signal $S_i$. As can be seen from FIGS. 7*a* through 7*i*, the auditory alert signal $S_i$ is different from the auditory alert signals $S_a$, $S_b$, $S_c$, $S_d$, $S_e$, $S_g$, and $S_h$.

Referring to FIGS. 7*a* through 7*i*, the control unit 59-3 controls the speaker 25 to output different auditory alert signals until the current composition is matched to the reference composition, by comparing the current composition, i.e., the size, position, and direction of the face, with the reference composition, i.e., the size, position, and direction of the reference face, thereby guiding a user to adjust the current composition. When the user adjusts the current composition in response to an auditory alert signal and thus the current composition is matched to the reference composition, the control unit 59-3 controls the speaker 25 to output an auditory match signal. According to another embodiment of the present invention, a voice message signal for inducing the current composition to be matched to the reference composition may be output. For example, when the current composition is not matched to the reference composition, a voice message signal such as "Please adjust composition" or "Please move to the right," etc., may be output. When the current composition is matched to the reference composition, a voice message signal such as "Best composition! Photograph will be automatically taken after 2 seconds" may be output.

Second, in order to allow manipulation of the digital image processing device during self-photographing, the digital signal processing unit 59 includes the face recognition unit 59-1, the comparison unit 59-2, and the control unit 59-3.

The face recognition unit 59-1 serves as a detector for detecting a composition of an object from a live-view image to be captured. More specifically, the face recognition unit 59-1 detects face information, i.e., the size, distance, and direction of a face within the display unit 23, as the composition of the object from the live-view image displayed in the display unit 23. The face information detection of the face recognition unit 59-1 has been described above, and thus description thereof will be omitted.

The storing unit 57 stores a reference composition that includes reference face information, i.e., the size, distance, and direction of a reference face. Specifically, the position and the direction of the reference face are values within a reference region that is a predetermined region off from the center of the display unit 23 as illustrated in FIG. 6b, and if the position and direction of a face from a live-view image are within the reference region, they are determined to be a desirable photographing composition. The reference composition stored in the storing unit 57 is used to introduce a composition of a face image displayed in the display unit 23 to a desirable photographing composition during photographing. The reference composition may be set as default or may be set to an appropriate value according to a user's taste.

The comparison unit 59-2 compares the composition of the current face from a live-view image (or a current composition) detected by the face recognition unit 59-1 with the reference composition stored in the storing unit 57 and outputs a comparison result to the control unit 59-3. In particular, the comparison unit 59-2 compares the size of the current face detected by the face recognition unit 59-1 with the size of a reference face stored in the storing unit 57, compares the distance of the current face with the distance of the reference face, and compares the direction of the current face with the direction of the reference face, and outputs comparison results to the control unit 59-3.

The control unit 59-3 performs a zoom operation, adjusts a flickering speed of the sub light 17, adjusts the color representation of the sub light 17, or controls a voice output of the speaker 25 according to the comparison results of the comparison unit 59-2.

The control unit 59-3 receives the comparison result regarding the face size from the comparison unit 59-2, performs a zoom-out operation if the size of the current face is larger than that of the reference face, and performs a zoom-in operation if the size of the current face is less than that of the reference face.

The control unit 59-3 receives a comparison result regarding a face position from the comparison unit 59-2 in order to determine how much different from a position of the reference face a position of the current face is, thereby controlling the flickering speed of the sub light 17. Here, the comparison result regarding the face position can be calculated by using the equation above, the face distance D=|Center of display unit−Center of face|. For example, when the face distance of the current face is greater than a predetermined amount, e.g., when the difference between the distance of the current face and the distance of the reference face is more than 1 cm, the flickering speed of the sub light 17 is relatively slow, indicating that the distance is far from the reference. When the face distance of the current face is less than a predetermined amount, e.g., when the difference is less than 1 cm, the flickering speed of the sub light 17 is re_fast indicating to the user that the distance is close to the reference. The control unit 59-3 may also output a voice signal for guiding the user to adjust the current distance by controlling the speaker 25 as well as the sub light 17. FIG. 6e shows that the sub light 17 flickers since the position and direction of the current face of FIG. 6a is outside the reference region.

The control unit 59-3 receives the comparison result of the face direction of a live-view image from the comparison unit 59-2 and controls the sub light 17 to emit a color if the direction of the current face is not matched to a direction of the reference face. For example as illustrated in FIG. 6f, if the direction of the current face tends to the right with respect to the direction of the reference face (if the face direction value θ is between −45° and 45°), the sub light 17 sequentially emits red, green, red, and green colors, and if the direction of the current face tends to the left with respect to the direction of the reference face (if the face direction value θ is between 45° and 135°), the sub light 17 sequentially emits red, yellow, red, and yellow colors. If the direction of the current face tends to the top with respect to the direction of the reference face (if the face direction value θ is between 135° and 225°), the sub light 17 continuously flickers green color, and if the direction of the current face tends to the bottom with respect to the direction of the reference face (if the face direction value θ is between −225° and 315°), the sub light 17 continuously flickers yellow color. The control unit 59-3 may also output a voice signal for guiding the user to adjust the current distance by controlling the speaker 25 as well as the sub light 17.

The control unit 59-3 simultaneously adjusts the flickering speed of the sub light 17 and the color representation of the sub light 17 in order to reflect the flickering speed and the color representation at the same time.

When the size, position, and direction of the current face are matched to those of the reference face, the control unit 59-3 controls the speaker 25 to output a voice signal indicating that photographing is to be performed after a lapse of several seconds. After a lapse of several seconds from a point in time when the voice signal is output, photographing is performed.

Figure 8:
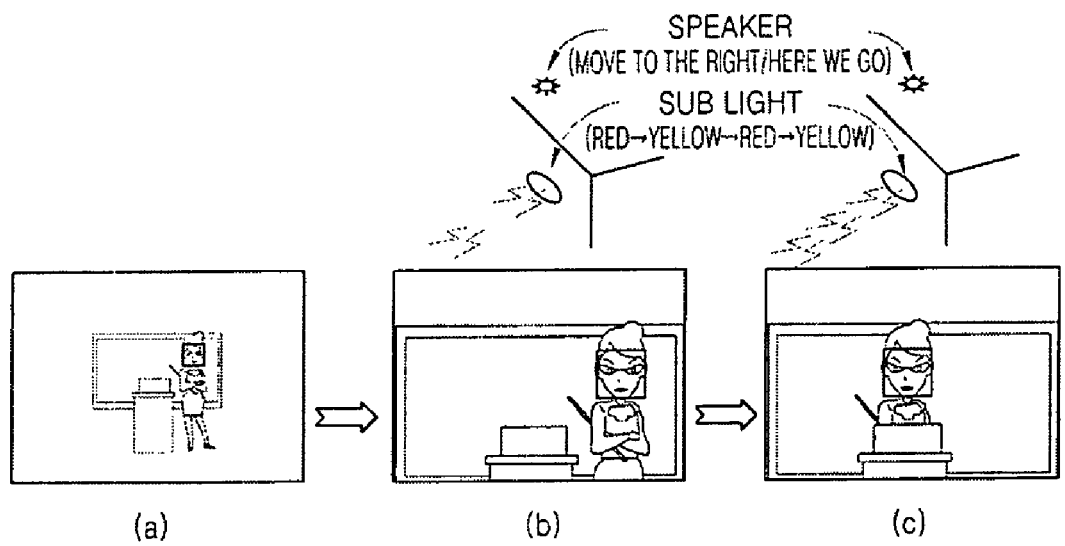

FIGS. 8a through 8c illustrate an example in which the live-view composition of a face is not matched to a reference composition during self-photographing of an individual and thus object composition adjustment is guided by the sub light 17 and the speaker 25. A zoom operation is performed as illustrated in FIG. 8b by comparing the size of the face with the size of a reference face in a live-view image illustrated in FIG. 8a. Since the position of the object is much different from a reference position and the direction of the object tends to the right in a zoomed live-view screen illustrated in FIG. 8b, the sub light 17 sequentially emits red, yellow, red, and yellow color, and the speaker 25 outputs a voice signal requesting movement to the right. Once a user recognizes the representation of the sub light 17 and the voice signal of the speaker 25, the user moves to the right as illustrated in FIG. 8c and then the speaker 25 outputs a voice signal indicating that photographing is to be performed, perhaps after a lapse of several seconds.

Figure 9:
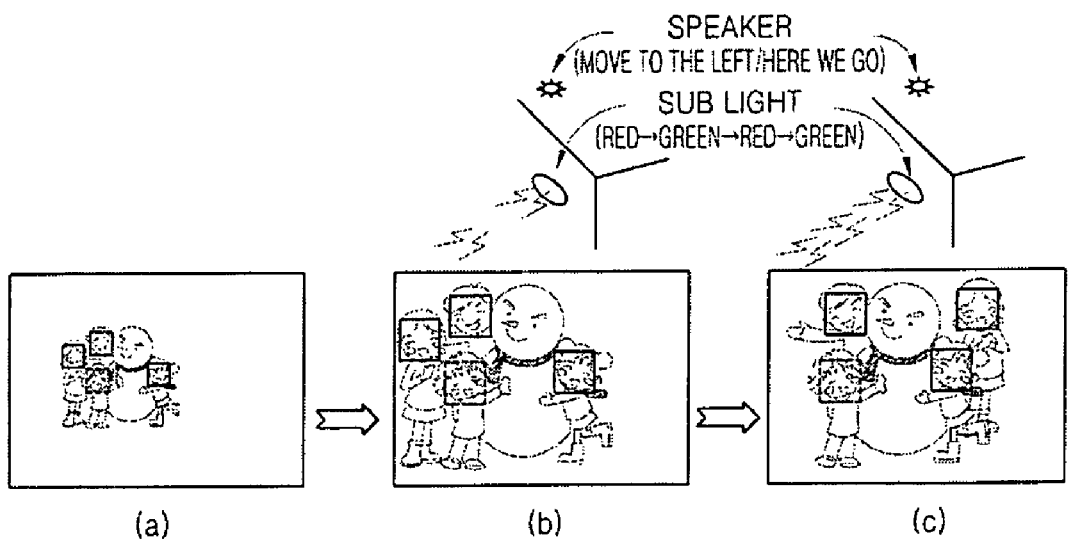

FIGS. 9a through 9c illustrate an example in which the live-view compositions of faces are not matched to a reference composition during self-photographing of a group of individuals and thus object composition adjustment is induced by the sub light 17 and the speaker 25. Face size information and face position information may be calculated as average values for self-photographing of a group of individuals. A zoom operation is performed as illustrated in FIG.

9b in a live-view image illustrated in FIG. 9a by comparing the sizes of faces with the size of a reference face. Since the position of objects are not much different from a position of a reference object and the directions of the objects tend to the right in a zoomed live-view screen illustrated in FIG. 9b, the sub light 17 sequentially emits red, green, red, and green color, and the speaker 252 outputs a voice signal requesting movement to the left. Once users recognize the representation of the sub light 17 and the voice signal of the speaker 25, the users move to the left as illustrated in FIG. 9c and then the speaker 25 outputs a voice signal indicating that photographing is to be performed, perhaps after a lapse of several seconds.

By introducing a predetermined photographing composition by using a visual and/or auditory alert signal, i.e., adjustment of the flickering speed and color representation of the sub light 17, the inconvenience of repeating photographing can be avoided.

Figure 10:
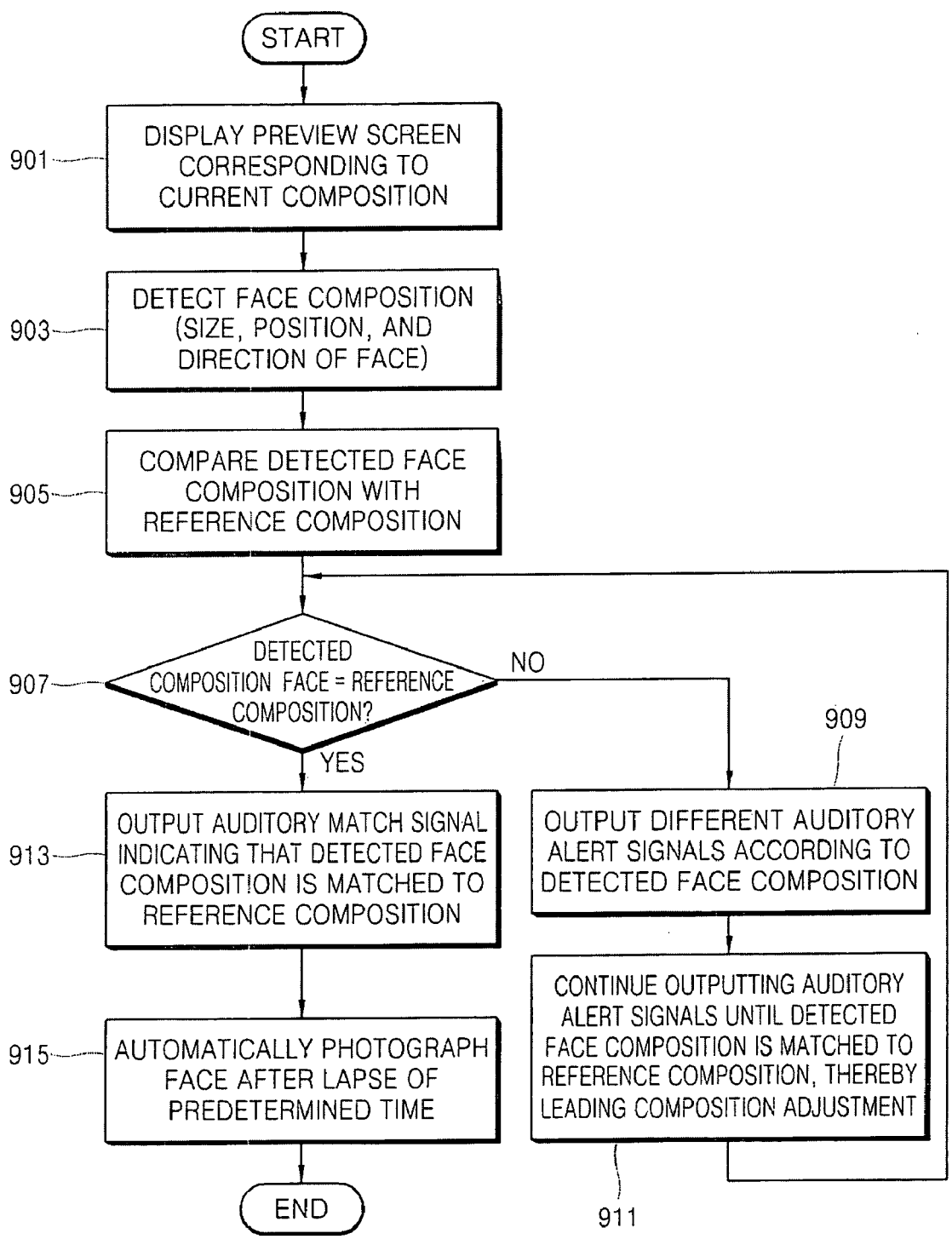
FIG. 10 is a flowchart illustrating a method of providing composition information in a digital image processing device according to a first embodiment of the present invention.

Hereinafter, a method of providing composition information in a digital image processing device will be described with reference to FIGS. 10 and 11. The method can be executed within the apparatus for providing composition information illustrated in FIG. 5. A main algorithm of the method may be executed within the digital signal processing unit 59 with the aid of peripheral components of the apparatus.

A method of providing composition information in a digital image processing device according to a first embodiment of the present invention will be described with reference to FIG. 10.

Once a user powers on a digital image processing device for photographing, the digital signal processing unit 59 displays a composition of a current face (or a current composition) in a live-view screen of the display unit 23 in operation 1001.

In operation 1003, the digital signal processing unit 59 detects the current composition. During face composition detection, the digital signal processing unit 59 detects a face recognition region based on a color or an edge, and may calculate the size of the face recognition region with respect to the live-view image as illustrated in FIG. 6a. The digital signal processing unit 59 may calculate the position of a face using a distance between a center of the face recognition region and a center of the display unit 23 as illustrated in FIG. 6b. In other words, a face distance D=|Center of display unit−Center of face|. Also, the digital signal processing unit 59 may calculate a face direction, which is a degree of the center of the face tending to the center of the display unit 23, as illustrated in FIG. 6c. The face direction value can be expressed in θ. The face direction detection is described above in detail, and thus description thereof is omitted.

Once the current composition including the size, position, and direction of the face is detected, the digital signal processing unit 59 compares the detected current composition with a reference composition stored in the storing unit 57 in operation 1005. The reference composition stored in the storing unit 57 may be set as default or may be set to an appropriate value according to a user's taste.

The digital signal processing unit 59 determines whether the detected current composition is matched to the reference composition in operation 1007.

If the detected current composition is not matched to the reference composition, the digital signal processing unit 59 controls the speaker 25 to output different auditory alert signals according to the detected current composition in operation 1009. The digital signal processing unit 59 outputs an auditory alert signal if the size of the current face is not matched to that of a reference face stored in the storing unit 57, if the position of the current face is not matched to that of the reference face, and if the direction of the current face is not matched to that of the reference face. A combination of the auditory alert signal corresponding to a face size, the auditory alert signal corresponding to a face position, and the auditory alert signal corresponding to a face direction finally controls the speaker 25. The auditory alert signals that are output according to the detected current composition are illustrated in FIGS. 7a through 7i except for FIG. 7f and have already been described and thus will not be described in detail again here.

In operation 1011, the digital signal processing unit 59 continues generating auditory alert signals until the detected current composition is matched to the reference composition, thereby inducing the user to adjust the current composition.

If the detected current composition is matched to the reference composition, the digital signal processing unit 59 controls the speaker 25 to output an auditory match signal indicating that the detected current composition is matched to the reference composition in operation 1013. FIG. 7f shows an auditory match signal that is output when the detected current composition is matched to the reference composition.

After the speaker 25 outputs the auditory match signal, the digital signal processing unit 59 captures an image by automatic shutter-input after a lapse of a predetermined time, e.g., 2 seconds, in operation 1015. When the current composition and the reference composition are matched to each other, an undesirable image may be captured due to vibration during a user's manipulation of the shutter-release button 11 for photographing. Thus, the digital signal processing unit 59 may perform a control operation so that an image having the current composition can be automatically captured after a lapse of a predetermined time from a point in time when the speaker 25 outputs the auditory match signal.

As such, the digital signal processing unit 59 controls the speaker 25 to output different auditory alert signals until the current composition is matched to the reference composition, by comparing the current composition, i.e., the size, position, and direction of the face, with the reference composition, i.e., the size, position, and direction of the reference face, thereby guiding a user to adjust the current composition. When the user adjusts the current composition in response to an auditory alert signal and thus the current composition is matched to the reference composition, the digital signal processing unit 59 controls the speaker 25 to output the auditory match signal. According to another embodiment of the present invention, a voice message signal for guiding the current composition to be matched to the reference composition may be output. For example, when the current composition is not matched to the reference composition, a voice message signal such as "Please adjust composition" or "Please move to the right" may be output. When the current composition is matched to the reference composition, a voice message signal such as "Best composition! Photograph will be automatically taken after 2 seconds" may be output.

Hereinafter, a method of providing composition information in a digital image processing device according to a second embodiment of the present invention will be described with reference to FIG. 11.

When a user stands in front of the digital image processing device for self-photographing, a live-view screen corresponding to a composition of a current object (or a current composition) is displayed in the display unit 23 in operation 1101. The current composition may be set by the user and may be set as default to a central portion of the screen if not set by the user.

The digital signal processing unit 59 detects the size, position, and direction of a face of the object displayed in the live-view screen in operation 1103. During face size detection, the digital signal processing unit 59 detects a face region based on a color or an edge. During face distance detection, the digital signal processing unit 59 may calculate the distance of the face using a distance between a central portion of the extracted face and a preset central portion of the display unit 23. In other words, a face distance D=|Center of display unit−Center of face|. For face direction detection, the digital signal processing 59 detects that the face tends to the right if the calculated face distance is positive (+D), and that the face tends to the left if the calculated face distance is negative (−D).

During face composition detection, the digital signal processing unit 59 detects a face recognition region based on a color or an edge, and may calculate the size of the face recognition region with respect to the live-view image as illustrated in FIG. 6a. The digital signal processing unit 59 may calculate the position of a face using a distance between a center of the face recognition region and a center of the display unit 23 as illustrated in FIG. 6b. In other words, a face distance D=|center of display unit−Center of face|. Also, the digital signal processing unit 59 may calculate a face direction, which is a degree of the center of the face tending to the center of the display unit 23, as illustrated in FIG. 6c. The face direction value can be expressed in $\theta$. As illustrated in FIG. 6f, when a face direction value $\theta$ is between −45° and 45°, it is determined that the face tends to the right, when a face direction value $\theta$ is between 45° and 135°, it is determined that the face tends to the top, when a face direction value $\theta$ is between 135° and 225°, it is determined that the face tends to the left, and when a face direction value $\theta$ is between −225° and 315°, it is determined that the face tends to the bottom.

The digital signal processing unit 59 determines whether the size of the current face is matched to that of a reference face stored in the storing unit 57 in operation 1105. The storing unit 57 stores the reference composition that includes reference face information, i.e., the size, position, and direction of a reference face. The reference composition stored in the storing unit 57 is used to introduce a composition of a face image displayed in the display unit 23 to a desirable photographing composition during photographing. The reference composition may be set as default or may be set to an appropriate value according to a user's taste.

If the size of the current face is not matched to that of a reference face, the digital signal processing unit 59 controls a zoom operation in operation 1107. The digital signal processing unit 59 performs a zoom-out operation if the size of the current face is larger than that of the reference face, and performs a zoom-in operation if the size of the current face is less than that of the reference face.

The digital signal processing unit 59 determines whether the position of the current face is matched to that of the reference face stored in the storing unit 57 in operation 1109.

If the position of the current face is not matched to that of the reference face, the digital signal processing unit 59 adjusts the flickering speed of the sub light 17 in operation 1111. The digital signal processing unit 59 reduces the flickering speed of the sub light 17 as the position of the current face is more different than the position of the reference face, e.g., when a difference between the position of the current face and the reference position is more than 1 cm. The digital signal processing unit 59 increases the flickering speed of the sub light 17 as the position of the current face is less different than the position of the reference face, e.g., when the difference is less than 1 cm. The digital signal processing unit 59 may also output a voice signal for inducing the user to adjust the current position by controlling the speaker 25 as well as the sub light 17.

The digital signal processing unit 59 determines whether the direction of the current face is equal to that of the reference face in operation 1113.

If the direction of the current face is not equal to that of the reference face, the digital signal processing unit 59 controls the color of the sub light 17 in operation 1115. As illustrated in FIG. 6f, if the direction of the current face tends to the right with respect to the direction of the reference face, i.e. if the face direction value $\theta$ is between −45° and 45°, the digital signal processing unit 59 controls the the sub light 17 to sequentially emit red, green, red, and green colors. If the direction of the current face tends to the left with respect to the direction of the reference face, i.e. if the face direction value $\theta$ is between 45° and 135°, the digital signal processing unit 59 controls the the sub light 17 to sequentially emit red, yellow, red, and yellow colors. If the direction of the current face tends to the top with respect to the direction of the reference face, i.e. if the face direction value $\theta$ is between 135° and 225°, the digital signal processing unit 59 controls the sub light 17 to continuously flicker green color. If the direction of the current face tends to the bottom with respect to the direction of the reference face, i.e. if the face direction value $\theta$ is between −225° and 315°, the digital signal processing unit 59 controls the sub light 17 to continuously flicker yellow color. The digital signal processing unit 59 may also output a voice signal for inducing adjustment of the direction of the current object by controlling the speaker 25 as well as the sub light 17.

The digital signal processing unit 59 simultaneously adjusts the flickering speed of the sub light 17 and the color representation of the sub light 17 in order to reflect the flickering speed and the color representation at the same time.

After the digital signal processing unit 59 induces adjustment of the composition of the object, it determines whether the size, position, and direction of the current face of the object are matched to those of the reference face in operation 1117. If so, the digital signal processing unit 59 controls the speaker 25 to output a voice signal indicating that photographing is to be performed after a lapse of predetermined time, e.g., 3 seconds, and photographing is then performed after a lapse of the several seconds in operation 1119.

As described above, according to the present invention, by means of a method and apparatus for providing composition information, which allows manipulation of a digital image processing device by using only auditory information beyond the limit of conventional manipulation of the digital image processing device which depends on only visual information, the digital image processing device can be manipulated conveniently.

Moreover, a predetermined photographing composition can be introduced by using only a visual alert signal without being restricted by the limit of conventional manipulation of the digital image processing device, the limit occurring during self-photographing, thereby removing the inconvenience of repeating photographing.

While the present invention has been particularly shown and described with reference to embodiments thereof, it will be understood by one of ordinary skill in the art that various changes in form and detail may be made therein without departing from the spirit and scope of the present invention as defined by the following claims.

What is claimed is:

1. An apparatus for providing composition information in a digital image processing device, the apparatus comprising:
- a detection unit that detects the composition of an object from a live-view image;
- a comparison unit that compares the detected composition with a reference composition; and
- a control unit that performs a control operation to output an alert signal until the detected composition is matched to the reference composition and that performs a control operation to output a match signal when the detected composition is matched to the reference composition;
- wherein the composition of the object can be set by a user, and if the composition of the object is not set by the user, the composition of the object is set to a central portion of a screen.

2. The apparatus of claim 1 wherein the alert signal and the match signal are auditory signals.

3. The apparatus of claim 1 wherein the alert signal and the match signal are visual signals.

4. The apparatus of claim 1, wherein the composition of the object includes the size, position, and direction of the object and the reference composition includes a size, position, and direction of a reference object.

5. The apparatus of claim 4, wherein the reference composition can be set by a user.

6. The apparatus of claim 1, wherein the control unit performs a control operation to output different alert signals until the composition of the object is matched to the reference composition.

7. The apparatus of claim 1, wherein the control unit performs a control operation to automatically photograph the object when the detected composition is matched to the reference composition.

8. The apparatus of claim 7, wherein the control unit operates with a predetermined delay between when the match is detected and when the photograph is taken.

9. The apparatus of claim 1, wherein the auditory alert signal and the auditory match signal include voice message signals.

10. An apparatus for providing composition information in a digital image processing device, the apparatus comprising:
- a detection unit that detects the composition of an object from a live-view image;
- a comparison unit that compares the detected composition with a reference composition; and
- a control unit that performs a control operation to output a visual alert signal until the detected composition is matched to the reference composition and that performs a control operation to automatically capture the live-view image after the match is detected;
- wherein the composition of the object can be set by a user, and if the composition of the object is not set by the user, the composition of the object is set to a central portion of a screen.

11. The apparatus of claim 10, wherein the control unit delays a predetermined time between when the match is detected and when the live-view image is automatically captured.

12. The apparatus of claim 10, wherein the composition of the object includes the size, position, and direction of the object and the reference composition includes size, position, and direction of a reference object.

13. The apparatus of claim 10, wherein the visual alert signal is output from a sub light that provides light to the object.

14. The apparatus of claim 13, wherein the control unit controls a zoom operation by comparing the size of the object with the size of the reference object, adjusts a flickering speed of the sub light by comparing the position of the object with the position of the reference object, and adjusts a color emitted by the sub light by comparing the direction of the object with the direction of the reference object.

15. A method of providing composition information in a digital image processing device, the method comprising:
- (a) detecting the composition of an object from a live-view image to be captured;
- (b) comparing the detected composition with a reference composition; and
- (c) performing a control operation to output an alert signal until the detected composition is matched to the reference composition and performing a control operation to output a match signal when the detected composition is matched to the reference composition;
- wherein the composition of the object can be set by a user, and if the composition of the object is not set by the user, the composition of the object is set to a central portion of a screen.

16. The method of claim 15, wherein the alert signal and the match signal include auditory signals.

17. The method of claim 15, wherein the alert signal and the match signals include visual signals.

18. The method of claim 15, further comprising (d) performing a control operation to automatically photograph the object after a lapse of a predetermined time from a point in time when the auditory match signal is output.

19. The method of claim 15, wherein (c) comprises performing a control operation to output different auditory alert signals until the composition of the object is matched to the reference composition.

20. The method of claim 15, wherein in (c), the auditory alert signal and the auditory match signal are voice message signals.

21. A method of providing composition information in a digital image processing device, the method comprising:
- (a) detecting the composition of an object, including the size, position, and direction of the object, from a live-view image;
- (b) comparing the detected composition with a reference composition including size, distance, and direction of a reference object;
- (c) outputting a visual alert signal until the detected composition is matched to the reference composition; and
- (d) automatically capturing the live-view image after a lapse of a predetermined time if the detected composition of the object is matched to the reference composition;
- wherein the composition of the object can be set by a user, and if the composition of the object is not set by the user, the composition of the object is set to a central portion of a screen.

22. The method of claim 21, wherein the composition of the object can be set by a user, and if the composition of the object is not set by the user, the composition of the object is set to a central portion of a screen.

23. The method of claim 21, wherein in (c), the visual alert signal includes output from a sub light that provides light to the object.

24. The method of claim 23, wherein (c) comprises controlling a zoom operation by comparing the size of the object with the size of the reference object, adjusting a flickering speed of the sub light by comparing the position of the object with the position of the reference object, and adjusting a color emitted by the sub light by comparing the direction of the object with the direction of the reference object.

* * * * *